United States Patent Office 3,101,346
Patented Aug. 20, 1963

3,101,346
5-(p-FLUOROPHENYL) - 2 - HYDROXYCYCLOPEN-
TANE(ACETIC ACIDS/ETHANOLS), LACTONES
AND ESTERS THEREOF, AND INTERMEDIATES
THERETO
Edward A. Brown, Wilmette, and Leland J. Chinn, Morton Grove, Ill., assignors to G. D. Searle & Co., Chicago, Ill., a corporation of Delaware
No Drawing. Filed Dec. 19, 1961, Ser. No. 160,659
7 Claims. (Cl. 260—343.3)

This invention relates to halophenylcyclopentanol derivatives and processes for the preparation thereof. More particularly, this invention relates to new and useful chemical compounds of the formula

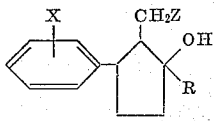

wherein X represents halogen; Z represents a carboxy, alkoxycarbonyl, or hydroxymethyl radical; and R represents an alkyl radical. Those skilled in the art will appreciate that when Z represents a carboxy radical cis to the hydroxyl on the cyclopentane ring, the compounds thus appointed can and do lactonize in acid media to compounds of the formula

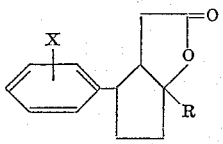

(X and R retaining the meanings previously assigned); and such lactones are, like the corresponding hydroxy acids, within the purview of the instant invention.

Among the halogens represented by X in the foregoing formulas, especially fluorine in the para position is preferred, although ortho and meta fluorine, and chlorine, bromine, and iodine in any position on the benzene ring, are also comprehended.

The alkoxycarbonyl radicals represented by Z are advantageously groupings of the formula

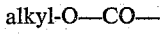

alkyl-O—CO— wherein the alkyl constituent is of lower order, namely, methyl, ethyl, propyl, isopropyl, butyl, isobutyl, sec-butyl, tert-butyl, pentyl, neopentyl, hexyl, isohexyl, heptyl, and like saturated, monovalent, acyclic, straight- or branched-chain hydrocarbon groupings of the formula

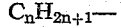

$C_nH_{2n+1}$— in which n represents a positive integer less than 9.

The aforesaid lower alkyl radicals are not only advantageous constituents of the grouping represented by Z as shown, but, together with hydrogen, are optimal embodiments of R in the above formulas as well.

The compounds to which this invention relates are useful by reason of their valuable pharmacological properties. Thus, for example, they block the effect of desoxycorticosterone acetate on urinary sodium and potassium. The intermediates whereby these compounds can be prepared are accordingly useful also, in addition to which two of them—6-(p-fluorobenzoyl)-4-oxohexanoic acid and 2-(p-fluorophenyl)-5-oxo-1-cyclopentaneacetic acid—are characterized by a separate and innate utility as anti-cholesterologenic agents: They inhibit exogenous hypercholesterolemia and likewise act to prevent the incorporation of mevalonic acid in the biosynthesis of cholesterol.

Preparation of the subject compounds starts with p-fluoroacetophenone, which is condensed with furfural on contact in methanol solution under the influence of sodium methoxide to give p-fluoro-β-(2-furyl)acrylophenone. Hydrolytic rearrangement of the acrylophenone, with internal oxidation and reduction, is achieved by heating in alcoholic hydrochloric acid, supplemented by acetic acid; and the 6-(p-fluorobenzoyl)-4-oxohexanoic acid thus obtained is recyclized to 2-(p-fluorophenyl)-5-oxo-1-cyclopenteneacetic acid by heating in alcoholic alkali and then acidifying. The cyclopenteneacetic acid is converted to its potassium salt and the salt hydrogenated in aqueous solution under the influence of palladium-on-charcoal catalyst to produce the corresponding cyclopentane wherein the ketonic oxygen is converted to hydroxyl by heating in aqueous alkali with sodium borohydride. The 5-(p-fluorophenyl)-2-hydroxycylopentaneacetic acid which, together with the corresponding lactone, results is esterified as desired with an alkanol in the presence of mineral acid or, where it is the methyl ester which is sought, with ethereal diazomethane. The ester, in turn, is reduced with lithium aluminum hydride in anhydrous ether to 5-(p - fluorophenyl(-2-hydroxycyclopentaneethanol. Alternatively, 5-(p-fluorophenyl)-2-oxocyclopentaneacetic acid is subject to the Grignard reaction with an appropriate alkylmagnesium bromide to give the corresponding 2-alkyl - 5 - (p - fluorophenyl) - 2 - hydroxycyclopentaneacetic acid and its lactone hereof; and of course the hydroxy acid thus obtained can be esterified and reduced to the 2 - alkyl-5-(p-fluorophenyl)-2-hydroxycyclopentaneethanol precisely as just outlined for compounds lacking the 2-alkyl substituent but otherwise identical.

The following examples described in detail compounds illustrative of the present invention and methods which have been devised for their manufacture. However, the invention is not to be construed as limited thereby, either in spirit or in scope, since it will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

*Example 1*

A. *p-fluoro-β-(2-furyl)acrylophenone.*—To a mixture of 113 parts of p-fluoroacetophenone, 104 parts of furfural, and 98 part of methanol is added a solution of approximately 17 parts of sodium methoxide in 306 parts of methanol. The resultant mixture is cooled to room temperatures and maintained thereat for 18 hours, then chilled to induce crystallization. The crystalline product thrown down is filtered off, washed with aqueous 50% methanol, and dried in air. The p-fluoro-β-(2-furyl)-acrylophenone thus obtained melts at approximately 70°.

B. *6-p-fluorobenzoyl) - 4 - oxohexanoic acid.*—A solution of 123 parts of p-fluoro-β-(2-furyl)acrylophenone in 984 parts of ethanol and 362 parts of concentrated hydrochloric acid is heated at the boiling point under reflux for 18 hours and then concentrated by vacuum distillation to a dark oil. To this oil is added 1230 parts of water, 725 parts of concentrated hydrochloric acid, and 615 parts of glacial acetic acid; and the resultant mixture is heated with vigorous agitation at the boiling point under reflux for 2 hours. The clear supernatant which eventuates is decanted (hot) from the residual heavy tar and chilled to induce crystallization. The crystals thrown down are filtered off, and the filtrate is used to reextract the aforesaid tar by mixing therewith as before at the boiling point. Decantation and chilling of the supernatant following this operation affords a second crop of crystals which are combined with the first; and the combined crops are washed with water, air dried, and recrystallized from ethyl acetate to give 6-(p-fluorobenzoyl)-4-oxohexanoic acid melting at approximately 123°.

C. *2-(p-fluorophenyl)-5-oxo-1-cyclopenteneacetic acid.*—A solution of 92 parts of 6-(p-fluorobenzoyl)-4-oxohexanoic acid in a solution of 184 parts of 85% potassium hydroxide in 9200 parts of water is heated at 85–87° for 1 hour and then filtered. Acidification of the filtrate with dilute hydrochloric acid induces precipitation. The precipitate is collected on a funnel, washed thereon with water, dried in air, and recrystallized from ethyl acetate to give 2-(p-fluorophenyl)-5-oxo-1-cyclopenteneacetic acid melting at approximately 153–154°.

D. *5-(p-fluorophenyl)-2-oxocyclopentaneacetic acid.*—A solution of 22 parts of 2-(p-fluorophenyl)-5-oxo-1-cyclopenteneacetic acid in a solution of approximately 6 parts of potassium hydroxide in 250 parts of water is reduced by agitation in contact with 3 atmospheres of hydrogen catalyzed by 4 parts of 5% palladium-on-charcoal during 21 hours. The resultant mixture is filtered, and the filtrate is acidified with dilute hydrochloric acid. The gummy precipitate thrown down is extracted with ether. The ether extract, washed with water, dried over anhydrous sodium sulfate, and stripped of solvent by distillation, affords a partly crystalline residue which is further purified by trituration with ether and subsequent recrystallization from ethyl acetate. The material thus obtained is 5-(p-fluorophenyl)-2-oxocyclopentaneacetic acid melting at 126–130°.

E. *5-(p-fluorophenyl)-2-hydroxycyclopentaneacetic acid lactone.*—A mixture of 20 parts of 5-(p-fluorophenyl)-2-oxocyclopentaneacetic acid, 800 parts of aqueous 5% sodium hydroxide, and 10 parts of sodium borohydride is maintained with agitation at room temperatures for 18 hours. To the resultant solution is slowly added 64 parts of glacial acetic acid, whereupon sufficient hydrochloric acid to induce acidity is incorporated. The oil which precipitates is partitioned between ethyl acetate and excess dilute aqueous potassium carbonate. The alkaline phase is separated and set aside for isolation of 5-p-fluorophenyl)-2-hydroxycyclopentaneacetic acid therefrom as detailed in Example 2; and the ethyl acetate phase is washed with water, dried over anhydrous sodium sulfate, and stripped of solvent by distillation, affording the desired 5-(p-fluorophenyl)-2-hydroxycyclopentaneacetic acid lactone as the residue melting at 41–44°. The product has the formula

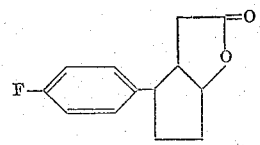

*Example 2*

*5-(p-fluorophenyl)-2-hydroxycyclopentaneacetic acid.*—The alkaline phase obtained in the course of the sodium borohydride reduction of 5-(p-fluorophenyl)-2-oxocyclopentaneacetic acid detailed in the foregoing Example 1E is acidified with hydrochloric acid; and the oil which thereupon precipitates is extracted with ether. The ether extract is washed with water, dried over anhydrous sodium sulfate, and stripped of solvent by distillation. The residue, crystallized from a mixture of ethyl acetate and hexane, affords 5-(p-fluorophenyl)-2-hydroxycyclopentaneacetic acid melting at 85–89°. The product has the formula

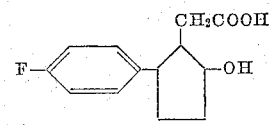

*Example 3*

*Methyl 5-(p-fluorophenyl)-2-hydroxycyclopentaneacetate.*—To a solution of 4 parts of 5-(p-fluorophenyl)-2-hydroxycyclopentaneacetic acid in 140 parts of anhydrous ether is added, with agitation, a solution of 2 parts of diazomethane in 140 parts of ether, temperature being maintained in the neighborhood of 5° throughout the addition and for 30 minutes with continued agitation thereafter. Solvent is then removed by distillation, leaving an oily residue which is the desired methyl 5-(p-fluorophenyl)-2-hydroxycyclopentaneacetate, of the formula

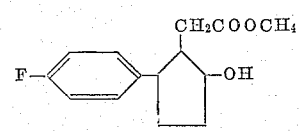

*Example 4*

*5-(p-fluorophenyl)-2-hydroxycyclopentaneethanol.*—A slurry of 14 parts of lithium aluminum hydride in 980 parts of anhydrous ether is maintained at the boiling point under reflux with agitation for 45 minutes, whereupon a solution of 10 parts of methyl 5-(p-fluorophenyl)-2-hydroxycyclopentaneacetate in 280 parts of anhydrous ether is slowly introduced. The resultant mixture is maintained at the boiling point under reflux with agitation for 3 hours, following which 200 parts of water and a solution of 16 parts of sodium hydroxide in 20 parts of water are consecutively and cautiously added. The ethereal phase is decanted from the pasty solid phase in the mixture thus obtained; and the solid residue is extracted with ether, the ether extract being combined with the ethereal material previously separated. The combined ethereal solutions are washed with water, dried over anhydrous sodium sulfate, and freed of solvent by distillation. The residue, recrystallized from a mixture of ethyl acetate and hexane, affords 5-(p-fluorophenyl)-2-hydroxycyclopentaneethanol melting at approximately 69–70°. The product has the formula

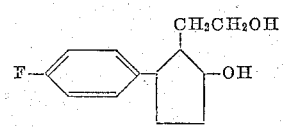

*Example 5*

*5-(p-fluorophenyl)-2-hydroxy-2-methylcyclopentaneacetic acid lactone.*—To a solution of approximately 1 part of 5-(p-fluorophenyl)-2-oxocyclopentaneacetic acid in 28 parts of anhydrous ether is slowly added a solution of 2 parts of methylmagnesium bromide in 5 parts of anhydrous ether. The resultant mixture is heated at the boiling point under reflux for 6 hours, whereupon 10 parts of 10% hydrochloric acid is slowly introduced. The ethereal phase is separated and extracted with dilute aqueous potassium carbonate, the alkaline extract being set aside for isolation of 5-(p-fluorophenyl)-2-hydroxy-2-methylcyclopentaneacetic acid as detailed in Example 6, while the ethereal material is washed with water, dried over anhydrous sodium sulfate, and stripped of solvent by distillation. The residual oil thus obtained is 5-(p-fluorophenyl)-2-hydroxy-2-methylcyclopentaneacetic acid lactone having the formula

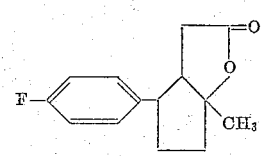

*Example 6*

*5-(p-fluorophenyl)-2-hydroxy-2-methylcyclopentaneacetic acid.*—The alkaline phase obtained during work-up of the reaction product resulting from interaction of 5-(p - fluorophenyl) - 2 - oxocyclopentaneacetic acid with methylmagnesium bromide as detailed in the foregoing Example 5 is acidified with hydrochloric acid; and the resultant mixture is extracted with ether. The ether extract is washed with water, dried over anhydrous sodium sulfate, and freed of solvent by distillation, leaving as the residue 5 - (p-fluorophenyl)-2-hydroxy-2-methylcyclopentaneacetic acid, having the formula

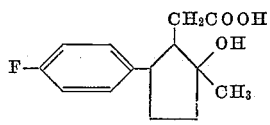

What is claimed is:

1. A compound selected from the group consisting of compounds having the formula and compounds having the formula

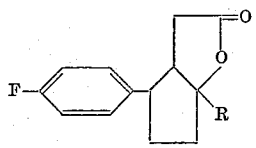

in which formulas Z represents a member of the group consisting of radicals having the formulas —COOH and —COO-lower alkyl and R represents a member of the group consisting of hydrogen and the methyl radical.

2. 5 - (p - fluorophenyl)-2-hydroxycyclopentaneacetic acid.
3. Methyl 5-(p-fluorophenyl)-2-hydroxycyclopentaneacetate.
4. 5-(p-fluorophenyl)-2-hydroxycyclopentaneethanol.
5. 5-(p-fluorophenyl)-2-hydroxy-2-methylcyclopentaneacetic acid lactone.
6. 6-(p-fluorobenzoyl)-4-oxohexanoic acid.
7. 2-(p-fluorophenyl)-5-oxo-1-cyclopenteneacetic acid.

References Cited in the file of this patent

Grinenko: Chemical Abstracts, volume 51 (1957), page 14769 QD 1. A51.